2 Sheets—Sheet 1.
J. W. MOORE & J. A. SVEDBERG.
Car-Starter.
No. 216,525.  Patented June 17, 1879.
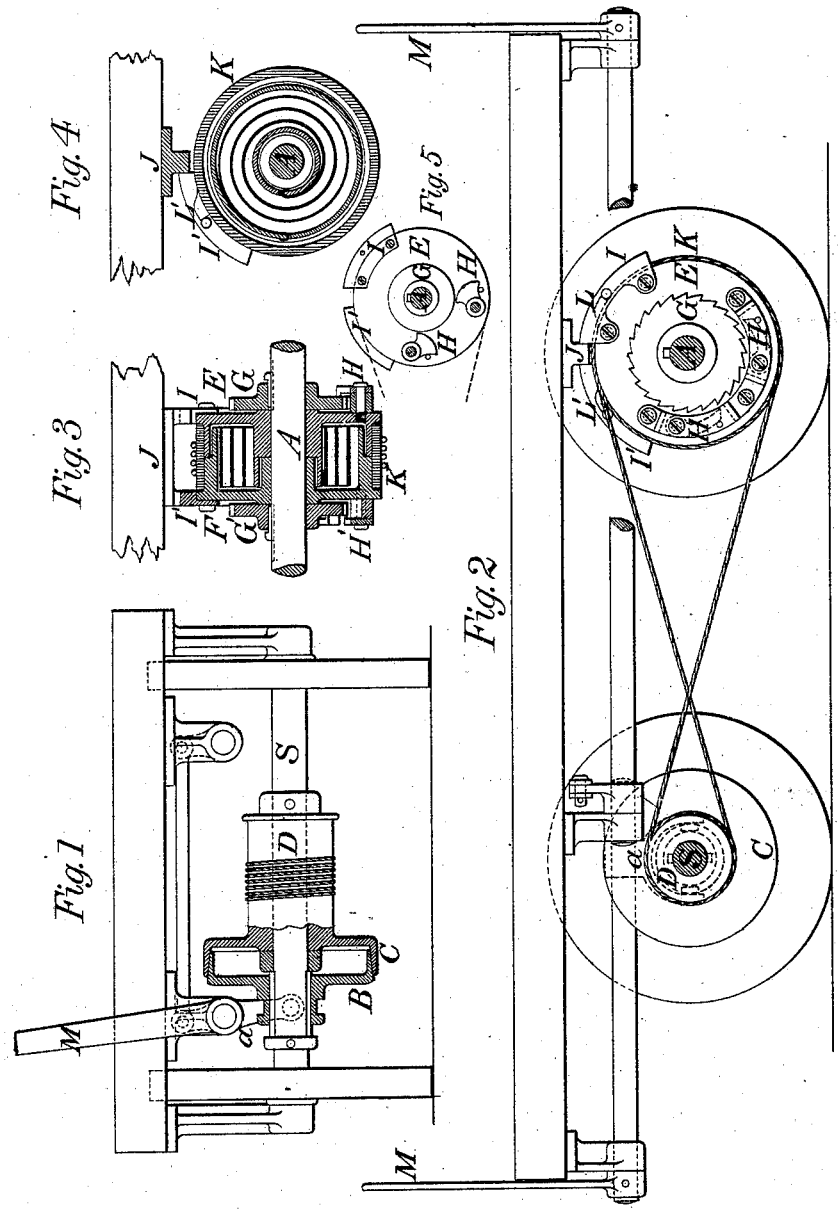

2 Sheets—Sheet 2.
J. W. MOORE & J. A. SVEDBERG.
Car-Starter.
No. 216,525.   Patented June 17, 1879.
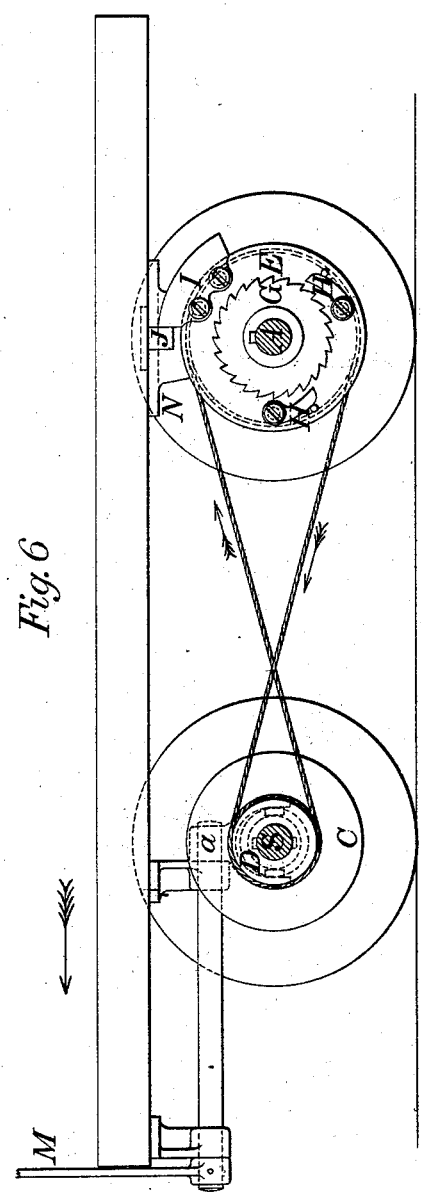
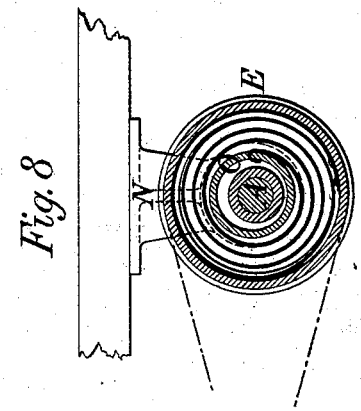
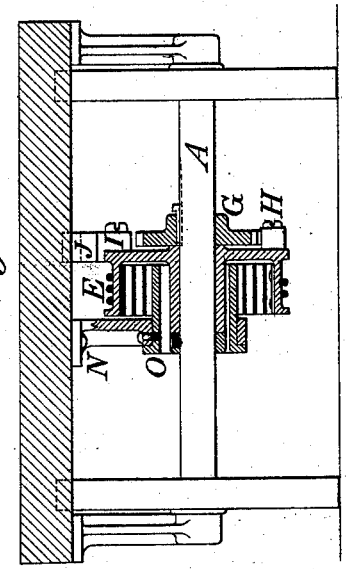
WITNESSES
INVENTORS
ATTORNEYS.

UNITED STATES PATENT OFFICE.

JOHN W. MOORE AND JOHN A. SVEDBERG, OF WASHINGTON, D. C.

IMPROVEMENT IN CAR-STARTERS.

Specification forming part of Letters Patent No. 216,525, dated June 17, 1879; application filed March 8, 1879.

*To all whom it may concern:*

Be it known that we, JOHN W. MOORE and JOHN A. SVEDBERG, of Washington, District of Columbia, have invented certain new and useful Improvements in Horse-Car Starters; and we do hereby declare that the following is a full, clear, and exact description of the invention, which will enable others skilled in the art to which it appertains to make and use the same, reference being had to the accompanying drawings, and to the letters of reference marked thereon, which form a part of this specification.

In Figures 1, 2, and 6, S is one axle of the car, on which the drum D is loosely hung. On this drum is cast or secured the flange C. Attached to the axle by means of one or more feathers is the wheel B, which revolves with the axle; but, being loose thereon, it can be moved in line with it by means of the forked lever or clutch-yoke a, or other suitable mechanism.

The periphery of the wheel B is conical, and when in contact with a similar face on the inside of the flange C forms a conical friction-clutch, which causes the drum to revolve with the axle.

The office of the drum D is merely to carry the endless rope or chain connecting the clutch on one axle with the operating-spring on the other axle, and the form of the drum and its attached clutch is not material. For instance, a simple pulley may be substituted for the drum, and any other convenient form of clutch for the conical friction one here shown; and a rope or chain of two ends, or two ropes or chains, wound in opposite directions around the drum or pulley on one axle and the spring-wheels on the other would serve the same purpose as the endless rope here described; but we describe this arrangement as the most efficient.

In Figs. 2, 3, 4, 5, 6, 7, and 8, A is the second axle of the car, on which are fitted loosely the two wheels E and F, between which is a spring, one end being secured to E, and the other to F, as shown in Figs. 3, 4, 7, and 8. On the other sides of E and F, and keyed firmly to the axle, are the disks G and G', on the outer edge of each of which are ratchet-teeth, as shown in Figs. 2 and 6, or smooth surfaces, as shown in Fig. 5.

On the wheels E and F are pivoted one or more pawls, H, as shown in Figs. 2 and 6, or eccentrics, as in Fig. 5, and also the buffer I. To the car-bottom is secured the stop J.

Around the drum-flanges of the wheels E and F is fitted loosely a cylinder, K, with two projecting catches, L and L', Figs. 2 and 4. Around this cylinder K and drum D, and connecting the two, is a wire rope or chain.

For the single-horse car, or one intended to move in one direction only, but part of this mechanism is necessary, as shown in Figs. 6, 7, and 8, where it will be seen that there is but one loose wheel, E, having a broad flange, upon which the connecting-rope is directly coiled, and within which is the operating-spring, one end fastened to the wheel and the other end to the sleeve O, which, in turn, is secured to the bracket N, resting upon the bottom of the car. The buffer I, stop J, and disk or ratchet-wheel G are the same as before described.

It is obvious that the sleeve O and bracket N are not essential elements, as here shown, since the spring may be attached to the car itself by any other appropriate device.

The operation of this invention is as follows: The car being in motion, and it being desired to stop it, the handle M (Figs. 1, 2, and 6) or its equivalent device is pressed sidewise till the conical clutch B and C are in contact, when the drum D will revolve with the axle S, and, by means of the connecting cord, rope, or chain, revolve the cylinder K in the opposite direction. The projecting catch L, being in contact with a pin secured to the buffer I on the wheel E, revolves the wheel E, and as the wheel F is held by contact of its buffer I' with the stop J the spring is wound till the car stops, when the pawls on the wheel E drop into the ratchet of the disk G.

The mechanism here shown as G and G', with the pawls H and H', for connecting the spring after it is wound up to the axle of the car, so that the force of the spring in unwinding is exerted to move the car, is also immaterial, since it is obvious that any other suitable mechanism may be used which will accomplish the same result. It is, however, important that the pawls or equivalent devices for connecting the wound spring to the axle should work automatically, so that when the spring is wound they will by their own action drop into place ready to fulfill their proper function.

The car is now ready to start, and upon the signal to do so the handle M is worked in the opposite direction, disconnecting the clutch, when the spring, exerting itself through the wheel E and its pawl and ratchet, revolves the axle A and starts the car. Should the car be moving in the opposite direction, the clutch is brought in contact, as before, and the cylinder K will be revolved in the direction to bring the catch L' in contact with the pin on the buffer I' on wheel F, revolving the wheel F and winding the spring, as before, and stopping the car. When the clutch is disconnected, the spring, operating through F instead of E, starts the car in the opposite direction from the former case, so that the manipulation of the device is the same in whichever direction the car is moving.

This invention is an improvement on the one secured to us by Letters Patent of December 12, 1876, No. 185,343.

Having thus described our invention, what we claim as new, and desire to secure by Letters Patent, is—

1. In combination with the axle A, the spring-bearing wheels and means for automatically connecting one of said wheels to the axle, and the buffer and stop for connecting the other wheel to the car-body, substantially as described.

2. The loose wheels E and F, connected by a spring coiled between them, one end attached to each, and having on said wheels the pawls H and H', or their equivalent, operating automatically, in combination with the ratchet-wheels or disks G and G', substantially as described.

3. The cylinder K, fitted loosely around the drum-flanges of the wheels E and F, and having the projecting catches L and L'.

4. The loose wheels E and F, connected by a spring coiled between them, one end attached to each, in combination with the drum K, having catches, by which said wheels are rotated in either direction by the revolution of the drum, substantially as and for the purposes specified.

5. The combination of the wheels E and F with the buffers I and I' and stop J, the pawls H and H', and the disk or ratchet-wheels G and G', the cylinder K, with its projections L and L', operating in one or both directions.

6. The combination of a drum or pulley and a suitable clutch affixed to one axle of the car, the spring-bearing wheels, having one end of the spring attached to each, on the other axle, and an endless rope or chain or its equivalent connecting the two, whereby the wheels may be revolved in one or both directions, and the same spring move the car in either or both directions, substantially as described.

In testimony that we claim the foregoing as our own we affix our signatures in presence of two witnesses.

JNO. W. MOORE.
    JOHN A. SVEDBERG.

Witnesses:
 GEO. A. SAWYER,
 GEO. F. GRAHAM.